United States Patent
Carlow et al.

(10) Patent No.: US 6,767,516 B1
(45) Date of Patent: Jul. 27, 2004

(54) CORONA DISCHARGE REACTOR

(75) Inventors: John Sydney Carlow, Southampton (GB); Martin Harte, Faringdon (GB); Norman Jorgensen, Reading (GB); Robert Francis King, Abingdon (GB); Roy McAdams, Didcot (GB); Fiona Winterbottom, Reading (GB)

(73) Assignee: Accentus plc, Didcot (GB)

( * ) Notice: Subject to any disclaimer, the term of this patent is extended or adjusted under 35 U.S.C. 154(b) by 0 days.

(21) Appl. No.: 09/959,472

(22) PCT Filed: Apr. 20, 2000

(86) PCT No.: PCT/GB00/01551

§ 371 (c)(1),
(2), (4) Date: Oct. 26, 2001

(87) PCT Pub. No.: WO00/66488

PCT Pub. Date: Nov. 9, 2000

(30) Foreign Application Priority Data

Apr. 28, 1999 (GB) .............................. 9909658

(51) Int. Cl.$^7$ ................................ B01J 19/08
(52) U.S. Cl. ............................. 422/186.04
(58) Field of Search ................... 422/186.04

(56) References Cited

U.S. PATENT DOCUMENTS 5,009,858 A * 4/1991 Mechtersheimer ..... 422/186.19

FOREIGN PATENT DOCUMENTS

WO    WO 99/15267    * 4/1999

* cited by examiner

Primary Examiner—Kishor Mayekar
(74) Attorney, Agent, or Firm—William H. Holt

(57) ABSTRACT

A modular corona discharge reactor in which individual reactor chambers are arranged vertically and are grouped in serial pairs.

5 Claims, 3 Drawing Sheets

CORONA DISCHARGE REACTOR

The present invention relates to reactors for the processing of materials in or carried by a gaseous phase by means of corona discharges.

BACKGROUND OF THE INVENTION

Considerable effort is being expended on the development of techniques for carrying out processes in the gaseous phase, using species which have been activated by corona discharges. Corona discharges occur in gaseous media when the localised electric field in the neighbourhood of a body exceeds the electrical breakdown voltage of the gaseous medium. Some existing corona discharge reactors consist of a chamber having an inlet and an outlet for a gaseous medium, an axial inner electrode and a cylindrical outer electrode surrounding the inner electrode. The electrical discharge within such reactors consists of streamers extending from the inner electrode towards the outer electrode. For the effective processing of a gaseous medium passing through the reactor, it is necessary to produce as many corona streamers as possible because any space which does not contain such streamers is dead space as far as the processing of the gaseous medium is concerned.

In one type of known corona discharge reactor the central electrode is in the form of a wire. However, the rapid fall-off in the electric field in a central wire electrode type of corona discharge reactor means that the distribution of streamers is very sensitive to wire position. This phenomenon limits the efficiency with which gaseous medium passing through the reactor can be treated.

Existing central wire electrode corona discharge reactors have diameters of a few centimetres and lengths of a few tens of centimeters. To process reasonable volumes of gas, high flow rates are required, which in turn tend to increase the mechanical instability of the central electrode due to aerodynamic effects as well as leading to short residence times in the reactor chamber of the medium to be processed. Hence, existing corona discharge reactors are limited inherently in their effectiveness.

Other corona discharge reactors, see for example our earlier patent GB 2 282 738, U.S. Pat. No. 5,041,145, U.S. Pat. No. 5,268,151 or U.S. Pat. No. 4,966,666, make use of central electrodes which have a larger diameter. Among other things this reduces the electric field gradient in the region of the central electrode at the same voltage, but there still remains a limitation on the separation between the inner and outer electrodes if an effective corona discharge is to be maintained. Merely increasing the length of corona discharge reactors does not provide an answer to the problem because the gas flow resistance becomes excessive. Also, corona discharge reactors operate in a pulsed manner, and the time taken for an energising pulse to traverse the length of the central electrode, provides another factor which limits the length of a corona discharge reactor.

GB specification 2 008 369A discloses an ozone generator which includes a plurality of parallel electric discharge chambers each of which has a central wire electrode. The wires are supported at their ends by two grid structures to one of which a common feed wire is connected to which, in use a d.c. voltage is applied.

As the device is operated in a d.c. mode, no a.c. current distribution effects have to be considered.

GB patent 1 589 394 discloses an ozone generator which includes a number of parallel corona discharge chambers, a single power supply, which may produce pulsed d.c., a.c., or a mixture of both, potentials is used, but no attempt is made to equalise the distribution of the power supplied to the discharge chambers, either in terms of magnitude or time.

U.S. Pat. No. 4,495,043 discloses an ozoniser in which there is a plurality of ozone producing chambers which are connected to a single pulsed a.c. power supply. However, the ozone producing chambers are not operated simultaneously or, continuously, but are operated sequentially in a pulsed a.c. mode, the duration of each pulse being related to the passage time of a pulse of ozone-producing gas through the corresponding ozone producing chamber, and the intervals between the pulses: applied to a given ozone-producing chamber being such that ozone produced by one power pulse is cleared from the chamber before the next power pulse is applied to that ozone producing chamber.

The patent is concerned mainly with the design of the power supply. The question of the electrical relationship between the ozone-producing chambers is not addressed at all.

U.S. Pat. No. 5,009,858 discloses an ozoniser in which ozone is produced by a silent electric discharge in a number of chambers operated in parallel from a common power supply. The electrical relationship between one ozone producing chamber and another is not discussed at all, but it would appear that the ozone producing chambers are operated in a continuous a.c. mode.

WO 99/15267 discloses a corona discharge reactor for processing a gaseous medium. The gaseous medium is fed via inlet and outlet plenum chambers through an array of reactor chambers. Each reactor chamber has an inner axial electrode and is formed as a longitudinal, circular section, gas passage through an electrode assembly, which thus provides each reactor chamber with an outer electrode concentric with its inner electrode. Pulsed electrical power is applied simultaneously or sequentially to the inner electrodes of each of the reactor chambers. There is, however, no disclosure relating to balancing the flow of gaseous medium through the reactor chambers.

SUMMARY OF THE INVENTION

It is an object of the present invention to provide an improved form of corona discharge reactor for use in the processing of gaseous media by means of electrically activated species.

The term gaseous medium includes the case when one or more constituents of the medium is in the form of an aerosol, or finely divided solid matter carried by a gaseous phase.

According to the present invention there is provided a modular corona discharge reactor for the processing of gaseous media, comprising an inlet duct and an outlet duct, a plurality of vertically mounted corona discharge reactor chambers positioned between the inlet and outlet ducts and communicating therewith, each corona discharge reactor having a cylindrical outer electrode structure and an axial inner electrode structure, a high voltage pulse power supply positioned in close coupled vertical alignment with the inner electrode of the reactor chamber and connected directly thereto, each high voltage pulse power supply being adapted to produce voltage pulses of a magnitude sufficient to excite a corona discharge in a gaseous medium to be processed as it passes through the associated reactor chamber, means for balancing the flow through the reactor chambers of the gaseous medium to be processed, a low voltage power supply connected to each high voltage pulse power supply and a control unit adapted to control the action of the low voltage power supply to cause the high voltage pulse power supplies to apply high voltage pulses to the corona discharge reactor chambers with a pre-determined temporal relationship.

In a particular embodiment of the invention, the reactors are arranged into groups of two reactors in series between the inlet and outlet ducts and the means for balancing the flow through the reactor chambers of the gaseous medium to be processed comprises a flow control device situated between the reactor chambers of each pair of reactor chambers.

A simple form of flow control device is a calibrated orifice plate.

As corona discharge reactors are noisy devices, electromagnetically, preferably at least the corona discharge reactor chambers are provided with electromagnetic screening.

BRIEF DESCRIPTION OF THE DRAWINGS

The invention will now be described, by way of example, with reference to the accompanying drawings, in which.

DETAILED DESCRIPTION OF THE INVENTION

Figure 1:
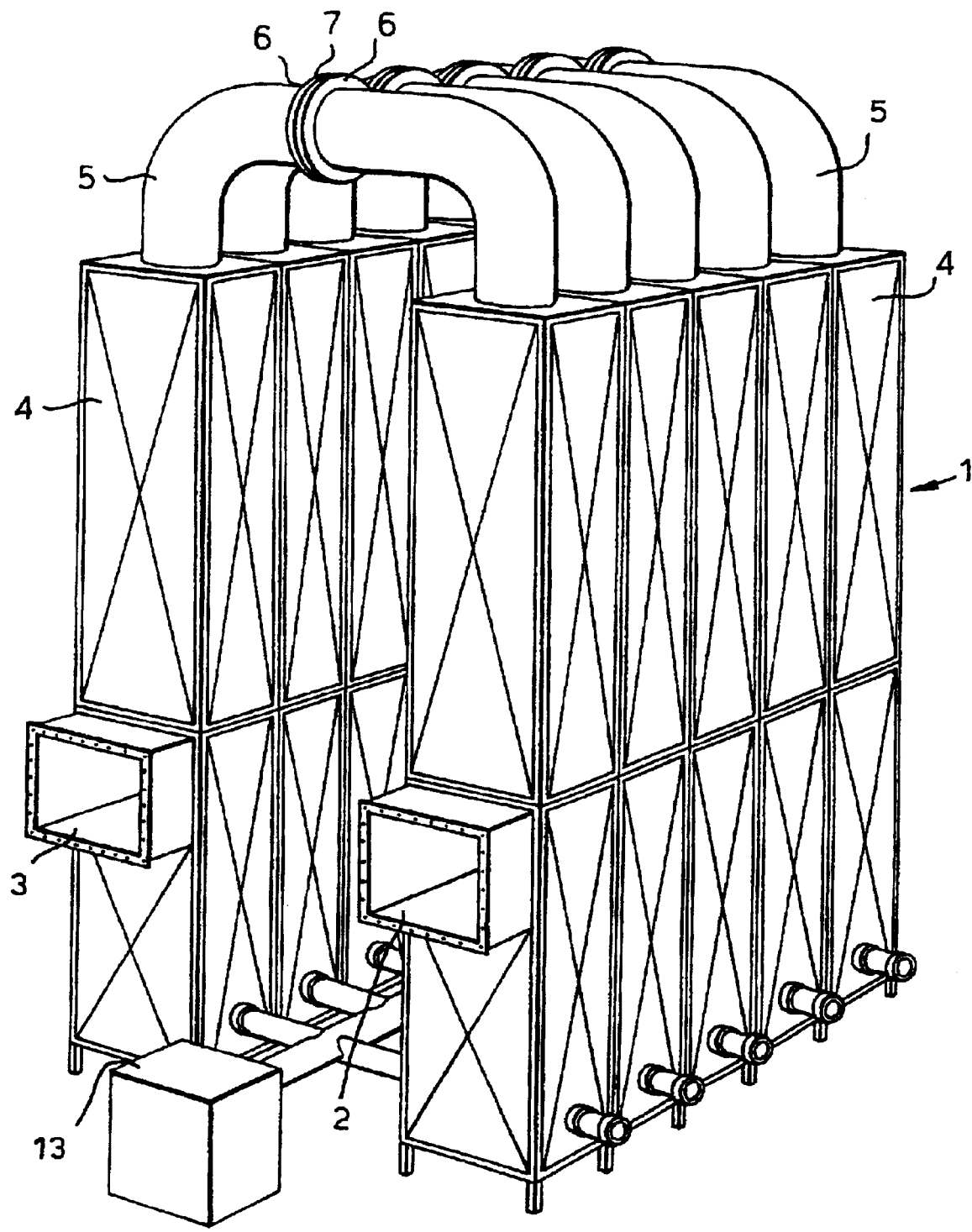
FIG. 1 is a schematic perspective view of an embodiment of the invention.
Figure 2:
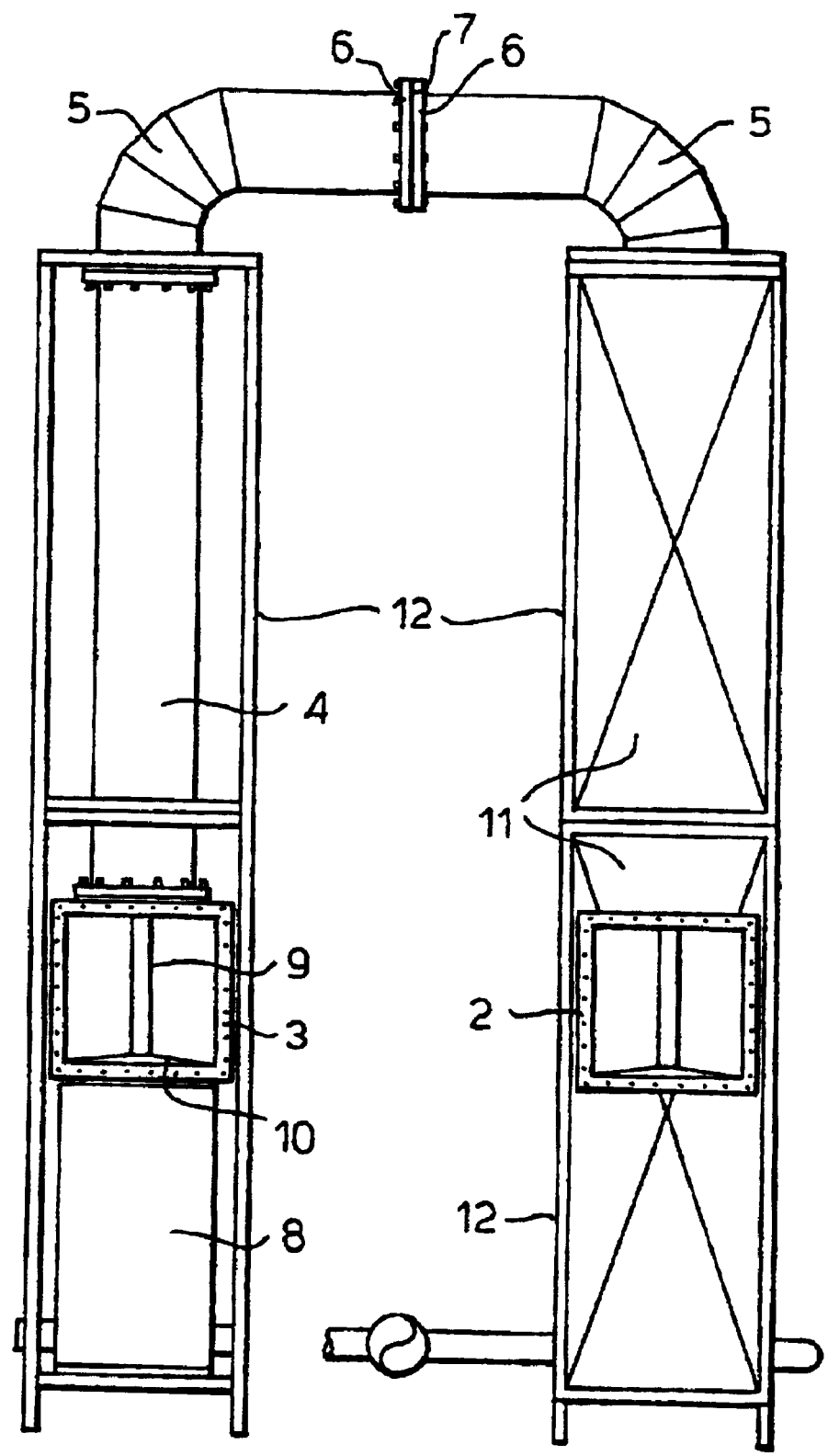
FIG. 2 is a front elevation of the embodiment of the invention shown in FIG. 1.

Referring to FIGS. 1 and 2 of the drawings, a modular corona discharge reactor 1 consists of an inlet duct 2 and an outlet duct 3. Positioned between the inlet duct 2 and the outlet duct 3 are ten corona discharge reactor chambers 4 (described below) arranged in five groups of pairs of reactor chambers 4 in series between the inlet duct 2 and the outlet duct 3. Each reactor chamber 4 in a pair is joined by a length 5 of ducting which terminates in a coupling flange 6. Sandwiched between the coupling flanges 6 is an orifice late 7, which also acts as a gasket between the coupling flanges 6. The holes in the orifice plates 7 are arranged on initial assembly of the reactor 1 to equalise the flow through the reactor chambers 4 of a gaseous medium to be processed in the reactor 1. If so desired, the orifice plates 7 can be replaced by adjustable valves, such as gate valves, so giving a capability for monitoring the gas flow rates through each pair of reactor chambers 4 and/or the processing efficiency of the reactor chambers 4 and varying the flow rates through the reactor chambers 4 to optimise the processing of the gaseous medium by the reactor 1 as a whole. Mounted beneath each reactor chamber 4 is a high voltage pulse power supply 8 which is connected directly to an extension 9 of a central electrode of each reactor chamber 4. The connection extensions 9 between the reactor chambers 4 and the high voltage pulse power supplies 8 pass through the inlet and outlet ducts 2 and 3 respectively, in insulating sleeves which are held in position in the ducts 2 and 3 by sealing collars 10. The reactor chambers 4 and the high voltage pulse power supplies 8 are enclosed in metal screens 11 to minimise the emission of electromagnetic noise from the reactor 1 when it is operating. In the embodiment of the invention described, the metal screens 11 are diamond-formed sheets of metal which are mounted on a frame 12 and sealed.

The high voltage pulse power supplies 8 are connected to a control unit 13 which is arranged to apply activating pulses from a low voltage power supply to the high voltage pulse power supplies 8 to cause them to apply high voltage pulses via connection extensions 9 to the central electrodes of the reactor chambers 4 with a pre-determined temporal relationship (usually simultaneously).

Figure 3:
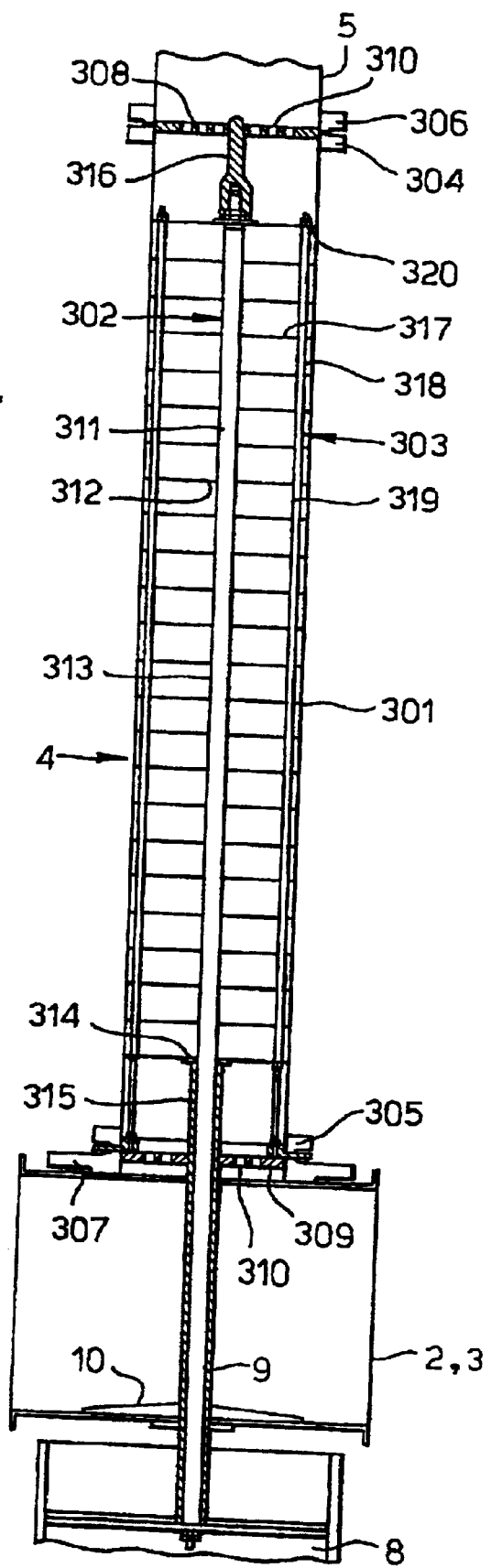
FIG. 3 is a longitudinal section through a corona discharge reactor chamber, included in the embodiment of FIG. 1.

Referring to FIG. 3 of the drawings, each reactor chamber 4 consists of an outer cylindrical casing 301 within which there is an axial central electrode assembly 302 and a co-axial outer electrode assembly 303. The casing 301 of the reactor chamber 4 has top and bottom flanges 304, 305, respectively. The top flange 304 is used to connect the reactor chamber 4 in conjunction with a flange 306 to the ducting 5 linking each pair of reactor chambers 4. The bottom flange 305 is used to connect the reactor chamber 4 to a flange 307 by which the reactor chamber 4 can be mounted upon whichever of the ducts 2 or 3 is appropriate. Positioned between the flanges 304, 306 and 305, 307 are upper and lower central electrode supports 308, 309, respectively.

The lower central electrode support 309 also serves to locate the outer electrode assembly 303. The upper and lower electrode supports 308, 309 have flown straightening holes 310 formed in them, and are made of a material which is both insulating and sufficiently deformable also to act as gaskets between the appropriate pairs of flanges 304, 306 and 305, 307. A suitable material for use as the electrode supports 308, 309 at gas temperatures of up to approximately 300° C. is polytetrafluoroethylene.

The inner electrode assembly 302 consists of a tube 311 made of the alloy known as HASTELLOY C upon which there is mounted a stack of disks 312 separated by lengths of tubing 313, both of which also are made of HASTELLOY C. The disks 312 have a diameter larger than that of the separator tubes 313. The lowest disk 312 rests upon a collar 314 formed at the upper end of the insulating sleeve 315 which surrounds the extension 9 of the inner electrode assembly 302 as it passes through the duct 2 or 3. The upper end of the inner electrode assembly 302 is located in the upper electrode support 308 by means of a locating spigot 316, which also is made of polytetrafluoroethylene.

The outer electrode assembly 303 is made of a stack of disks 317 separated by tubes 318 which are mounted on, and clamped together by twelve regularly spaced rods 319 and nuts 320. The whole outer electrode assembly 301 also is made of the alloy HASTELLOY C.

The vertical arrangement of the reactor chambers 4 and the directly connected high voltage pulse power supplies 8 is not only efficient electrically, but also ensures that no bending stresses are imposed upon the reactor chambers 4, and in particular, upon the central electrodes 302 of the reactor chambers 4, so ensuring that the gaps between the disks 312 and 317 of the inner and outer electrode assemblies 302, 303, respectively do not alter.

The in-series pairs of reactor chambers 4 decreases the floor area occupied by the reactor and also enables the inlet and outlet ducts 2 and 3 to be placed close together, which also is operationally convenient.

The invention is not restricted to the details of the foregoing example. For instance, an arrangement of ten corona discharge reactor chambers 4 is described. It will be appreciated that more or less than ten may be employed according to the operating performance required. The use of HASTELLOY C for the inner electrode 302 is described, but other metals or metal alloys may be employed depending upon the gaseous environment in which the electrode is required to operate.

What is claimed is:

1. A modular corona discharge reactor for the processing of gaseous media, comprising an inlet duct and an outlet duct, characterised by the features in combination comprising a plurality of vertically mounted corona discharge reactor chambers positioned between the inlet and outlet ducts and communicating therewith, each corona discharge reactor having a cylindrical outer electrode structure and an axial inner electrode structure, a high voltage pulse power supply positioned in vertical alignment with the inner electrode of the reactor chamber and connected directly thereto, each high voltage pulse power supply being adapted to produce voltage pulses of a magnitude sufficient to excite a corona discharge in a gaseous medium to be processed as it passes through the associated reactor chamber, means for balancing the flow through the reactor chambers of the gaseous medium to be processed, a low voltage power supply connected to each high voltage pulse power supply and a control unit for controlling the action of the low voltage power supply to cause the high voltage pulse power supply to apply high voltage pulses to the corona discharge reactor chambers with a pre-determined temporal relationship.

2. A corona discharge reactor according to claim 1, wherein the reactor chambers are arranged as a series of one or more pairs of reactor chambers and the means for balancing the flow through the reactor chambers of the gaseous medium comprises a flow control device situated between the reactor chambers of the or each pair of reactor chambers.

3. A corona discharge reactor according to claim 2, wherein the or each flow control device comprises a calibrated orifice plate.

4. A corona discharge reactor according to claim 2, wherein the or each flow control device comprises an adjustable valve.

5. A corona discharge reactor according to claim 1, wherein at least the reactor chambers and their associated high voltage pulse power supplies are screened electromagnetically.

* * * * *